(12) United States Patent
Kawano et al.

(10) Patent No.: US 10,137,405 B2
(45) Date of Patent: Nov. 27, 2018

(54) POROUS CARBON, HUMIDITY CONTROL ADSORBENT, ADSORPTION HEAT PUMP, AND FUEL CELL

(71) Applicant: TOYO TANSO CO., LTD., Osaka-shi, Osaka (JP)

(72) Inventors: Takanori Kawano, Osaka (JP); Takahiro Morishita, Osaka (JP); Hironori Orikasa, Osaka (JP)

(73) Assignee: TOYO TANSO CO., LTD., Osaka-shi (JP)

( * ) Notice: Subject to any disclaimer, the term of this patent is extended or adjusted under 35 U.S.C. 154(b) by 325 days.

(21) Appl. No.: 14/911,593

(22) PCT Filed: Jun. 16, 2014

(86) PCT No.: PCT/JP2014/065925
§ 371 (c)(1),
(2) Date: Feb. 11, 2016

(87) PCT Pub. No.: WO2015/033643
PCT Pub. Date: Mar. 12, 2015

(65) Prior Publication Data
US 2016/0199809 A1  Jul. 14, 2016

(30) Foreign Application Priority Data
Sep. 6, 2013 (JP) .................. 2013-184729

(51) Int. Cl.
*B01J 20/00* (2006.01)
*B01D 53/28* (2006.01)
(Continued)

(52) U.S. Cl.
CPC ........... *B01D 53/28* (2013.01); *B01D 53/261* (2013.01); *B01J 20/041* (2013.01); *B01J 20/20* (2013.01);
(Continued)

(58) Field of Classification Search
CPC ............. B01D 53/28; B01D 2253/102; B01D 2253/31; B01D 2257/80; B01D 53/261;
(Continued)

(56) References Cited

U.S. PATENT DOCUMENTS

2011/0315922 A1   12/2011   Elsayed et al.

FOREIGN PATENT DOCUMENTS

| CN | 102325721 A | 1/2012 |
|---|---|---|
| EP | 2 407 423 A1 | 1/2012 |

(Continued)

OTHER PUBLICATIONS

Li, Xin, and Zhong Li. "Equilibrium and Do-Do Model Fitting of Water Adsorption on Four Commercial Activated Carbons with Different Surface Chemistry and Pore Structure." Journal of Chemical & Engineering Data 55.12 (2010): 5729-5732.*

(Continued)

*Primary Examiner* — Richard M Rump
(74) *Attorney, Agent, or Firm* — Westerman, Hattori, Daniels & Adrian, LLP

(57) ABSTRACT

A porous carbon that can sufficiently adsorb water vapor on a high humidity side is provided.

A porous carbon is characterized by having mesopores and micropores and having a water vapor adsorbed amount ratio, as defined by the following expression (1), of 1.8 or higher. It is particularly preferable that the water vapor adsorbed amount ratio as defined by the following expression (1) be 2.0 or higher. It is also preferable that the water vapor adsorbed amount at a relative humidity of 70% be 50 mg/g or greater.

Water vapor adsorbed amount ratio=water vapor adsorbed amount at a relative humidity of 90%/ water vapor adsorbed amount at a relative humidity of 70%. (1)

15 Claims, 2 Drawing Sheets

(51) Int. Cl.

| | | |
|---|---|---|
| *B01J 20/28* | (2006.01) | |
| *H01M 4/86* | (2006.01) | |
| *H01M 4/96* | (2006.01) | |
| *B01J 20/20* | (2006.01) | |
| *B01D 53/26* | (2006.01) | |
| *B01J 20/04* | (2006.01) | |
| *B01J 20/30* | (2006.01) | |
| *C01B 31/00* | (2006.01) | |
| *H01M 4/88* | (2006.01) | |
| *H01M 8/0234* | (2016.01) | |
| *F25B 17/08* | (2006.01) | |
| *F25B 30/04* | (2006.01) | |

(52) U.S. Cl.
CPC ..... *B01J 20/2808* (2013.01); *B01J 20/28069* (2013.01); *B01J 20/28071* (2013.01); *B01J 20/28073* (2013.01); *B01J 20/28076* (2013.01); *B01J 20/28083* (2013.01); *B01J 20/28092* (2013.01); *B01J 20/3078* (2013.01); *C01B 31/00* (2013.01); *F25B 17/08* (2013.01); *F25B 30/04* (2013.01); *H01M 4/8605* (2013.01); *H01M 4/8807* (2013.01); *H01M 4/96* (2013.01); *H01M 8/0234* (2013.01); *B01D 2253/102* (2013.01); *B01D 2253/31* (2013.01); *B01D 2257/80* (2013.01); *B01J 2220/46* (2013.01); *Y02P 20/129* (2015.11)

(58) Field of Classification Search
CPC .... H01M 4/96; H01M 4/8605; H01M 4/8807; H01M 8/0234; Y02P 20/129; B01J 2220/46; B01J 20/2808; B01J 20/28092; B01J 20/28071; B01J 20/28083; B01J 20/28076; B01J 20/28073; B01J 20/28069; B01J 20/041; B01J 20/20; B01J 20/3078; C01B 32/30; C01B 31/00; F25B 30/04; F25B 17/08
See application file for complete search history.

(56) References Cited

FOREIGN PATENT DOCUMENTS

| JP | 2-187127 A | | 7/1990 |
|---|---|---|---|
| JP | 2000-72426 A | | 3/2000 |
| JP | 2002-80213 A | | 3/2002 |
| JP | 2005-41769 A | | 2/2005 |
| JP | 2006-297341 A | | 11/2006 |
| JP | 2007-209844 A | | 8/2007 |
| JP | 2009027527 A | * | 2/2009 |
| JP | 2010-241648 A | | 10/2010 |
| JP | 2012-508094 A | | 4/2012 |
| WO | 2006/103404 A1 | | 10/2006 |
| WO | 2010/103323 A1 | | 9/2010 |

OTHER PUBLICATIONS

English machine translation of JP2009027527A.*
Abiko, Hironobu. "Adsorption and desorption behavior of water and organic vapor of allophanic soil-templated porous carbon materials." Journal of the Ceramic Society of Japan 120.1408 (2012): 603-608.*
International Search Report dated Sep. 16, 2014, issued in counterpart International Application No. PCT/JP2014/065925 (2 pages).
Noue et al., "A Study of the Adsorber Specifications of Compact Adsorption Refrigerators for Automobiles", Denso Technical Review, 2006, pp. 121-129, vol. 11, No. 1, w/ English translation (11 pages).
Watanabe, "Development of Adsorption Heat Pump", Adsorption News, Jul. 1996, pp. 12-16, vol. 10, No. 3, w/ English translation (7 pages).
Watanabe et al., "Operating Limits of Heat Pump Using Adsorption of Structural Active Carbon/Water Vapour", Kagaku Kogaku Ronbunshu, 1989, pp. 38-43, vol. 15, No. 1, w/ English translation (7 pages).
"Synthesis and reaction of polymers [2]", Experimental Polymer Science, Mar. 28, 1996, p. 158, vol. 3, w/ English translation (3 pages).
Extended European Search Report dated Apr. 11, 2017, issued in counterpart European Application No. 14842926.9. (11 pages).
Office Action dated Jan. 17, 2017, issued in counterpart Chinese Patent Application No. 201480046082.1, with English translation. (14 pages).

* cited by examiner

POROUS CARBON, HUMIDITY CONTROL ADSORBENT, ADSORPTION HEAT PUMP, AND FUEL CELL

TECHNICAL FIELD

The present invention relates to a porous carbon as well as associated materials and apparatuses, and more particularly to a porous carbon that can sufficiently adsorb water vapor on a high humidity side, as well as associated materials and apparatuses.

BACKGROUND ART

Heat pumps and the like, such as adsorption refrigerators for automobiles, require a large solvent adsorbing amount, a fast adsorption and desorption rate, and high response for applied pressure. In addition, a certain degree of chemical stability is required because they are exposed to high temperatures. As shown in non-patent literatures 1 to 3 listed below, however, among activated carbons and silica gels, which are regarded as common adsorbents, there is no material that can sufficiently meet the adsorption performance (adsorbing amount, and adsorption and desorption rate) that is currently required. In particular, there has been no material that can adsorb water vapor sufficiently on a high humidity side.

A carbon material for humidity control material has been proposed that is obtained by carbonizing petroleum coke at 650° C. to 850° C. and is characterized by having pores in the range of 20 volume % to 30 volume % (see Patent Literature 1 listed below).

CITATION LIST

Patent Literature

[Patent Literature 1] Japanese Published Unexamined Patent Application No. 2007-209844

Non-Patent Literature

[Non-Patent Literature 1] Denso Technical Review, Vol. 11, No. 1, 2006.
[Non-Patent Literature 2] Adsorption News, Vol. 10, No. 3, pp. 12-16 (July 1996), The Japan Society on Adsorption.
[Non-Patent Literature 3] Kagaku Kogaku Ronbunshu, 15(1), pp. 38-43.

SUMMARY OF INVENTION

Technical Problem

Nevertheless, even when the carbon material for humidity control shown in Patent Literature 1 is used, there has been a problem that water vapor cannot be adsorbed on a high humidity side.

In view of the foregoing, it is an object of the present invention to provide a porous carbon that can sufficiently adsorb water vapor on a high humidity side, as well as associated materials and apparatuses.

Solution to Problem

In order to accomplish the foregoing object, the present invention provides a porous carbon characterized by comprising mesopores and micropores and having a mesopore volume of from 0.9 mL/g to 2.0 mL/g and a water vapor adsorbed amount ratio of 1.8 or higher, the water vapor adsorbed amount ratio being defined by the following expression (1):

$$\text{Water vapor adsorbed amount ratio} = \text{water vapor adsorbed amount at a relative humidity of 90\%} / \text{water vapor adsorbed amount at a relative humidity of 70\%}. \quad (1)$$

Advantageous Effects of Invention

The present invention can achieve a significant advantageous effect of providing a porous carbon that can sufficiently adsorb water vapor on a high humidity side, as well as associated materials and apparatuses.

BRIEF DESCRIPTION OF DRAWINGS

FIG. 1 illustrates a manufacturing process of the present invention, wherein FIG. 1(a) shows a state in which a polyamic acid resin and magnesium oxide are mixed; FIG. 1(b) shows the mixture that has been heat-treated, and FIG. 1(c) shows a porous carbon.

DESCRIPTION OF EMBODIMENTS

Figure 1:
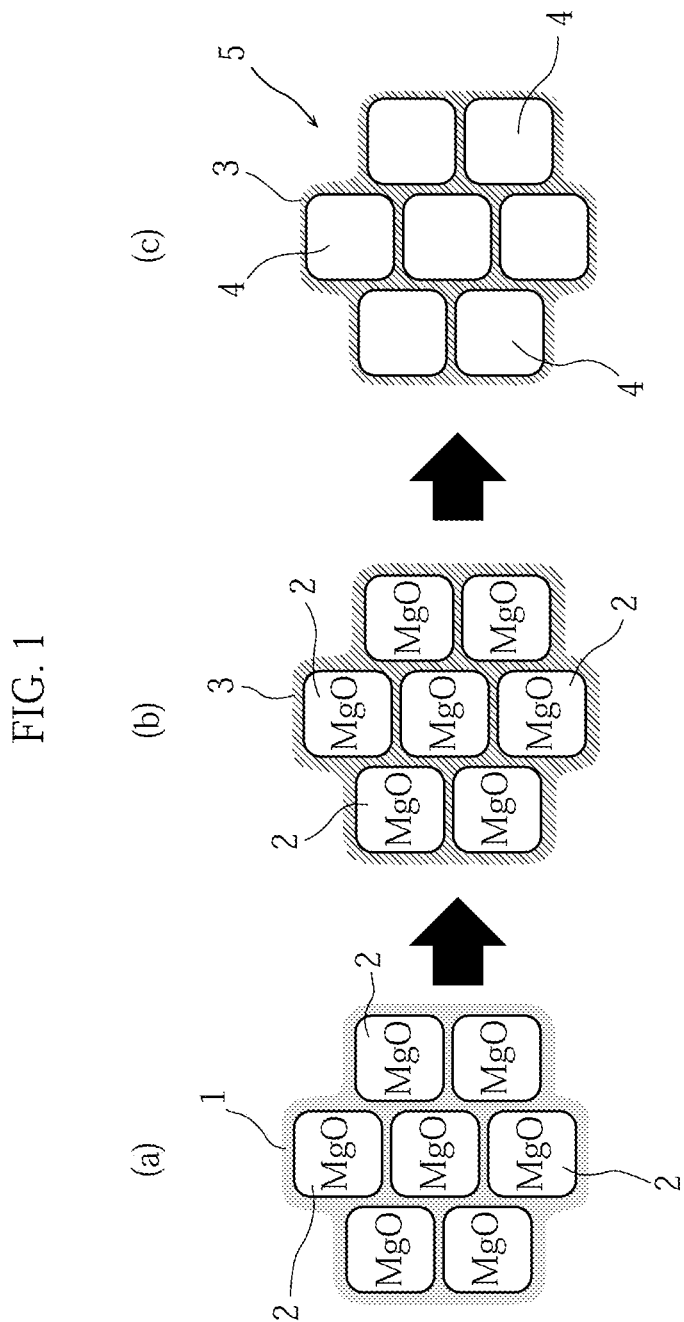

In order to accomplish the foregoing object, the present invention provides a porous carbon characterized by comprising mesopores and micropores and having a mesopore volume of from 0.9 mL/g to 2.0 mL/g and a water vapor adsorbed amount ratio of 1.8 or higher, the water vapor adsorbed amount ratio being defined by the following expression (1):

$$\text{Water vapor adsorbed amount ratio} = \text{water vapor adsorbed amount at a relative humidity of 90\%} / \text{water vapor adsorbed amount at a relative humidity of 70\%}. \quad (1)$$

In the case where the water vapor adsorbed amount ratio is less than 1.8, the porous carbon only has little extra capacity for adsorbing water vapor (i.e., the porous carbon is in the state where the pores in the porous carbon are almost filled with water) at the time point when the relative humidity is 70%. Therefore, when the relative humidity exceeds 70%, it can adsorb little more water vapor, making it difficult to control the water vapor adsorbed amount. On the other hand, in the case where the water vapor adsorbed amount ratio is 1.8 or higher, the porous carbon has sufficient extra capacity for adsorbing water vapor (i.e., the porous carbon is in the state where the pores therein are not filled with water) at the time point when the relative humidity is 70%. Therefore, even when the relative humidity exceeds 70%, it can adsorb more water vapor, making it possible to control the water vapor adsorbed amount sufficiently. The mesopore volume is restricted to be from 0.9 mL/g to 2.0 mL/g for the following reason. If the mesopore volume is less than 0.9 mL/g, water vapor may not be adsorbed sufficiently on a high humidity side because the specific surface area may be too small. On the other hand, if the mesopore volume exceeds 2.0 mL/g, the volume (ratio) of micropores in all the pores becomes very small. Therefore, a specific surface area sufficient for adsorbing water vapor may not be ensured.

It is desirable that the water vapor adsorbed amount ratio be 2.0 or higher.

When the water vapor adsorbed amount ratio is 2.0 or higher, the porous carbon can adsorb more water vapor under a high humidity atmosphere, so it can exhibit the function as an adsorbent more significantly.

It is desirable that the water vapor adsorbed amount at a relative humidity of 70% be 50 mg/g or greater.

If the water vapor adsorbed amount at a relative humidity of 70% is less than 50 mg/g, the amount of water vapor that can be adsorbed is small. This means that the function as an adsorbent cannot be fully exhibited, so the field of application may be limited.

It is desirable that the water vapor adsorbed amount at a relative humidity of 90% be from 300 mg/g to 700 mg/g.

If the water vapor adsorbed amount at a relative humidity of 90% is less than 300 mg/g, the function as an adsorbent is low. Therefore, the field of application may be limited. On the other hand, if the water vapor adsorbed amount at a relative humidity of 90% exceeds 700 mg/g, almost all the micropores, in which the adsorption phenomenon takes place mainly, are filled with water vapor. Therefore, it may become difficult to control the adsorption behavior.

It should be noted that although the adsorption phenomenon of water vapor mainly takes place in the micropores, as mentioned above, the amount of adsorbed water vapor on a high humidity side is affected by the mesopore volume.

It is desirable that the mesopores have a pore diameter of from 3 nm to 50 nm, and in particular, it is desirable that the mesopores have a pore diameter of from 4.5 nm to 50 nm.

The reason why the pore diameter of the mesopores is restricted to 3 nm or larger (particularly to 4.5 nm or larger) is that it may be difficult to prepare a porous carbon that has a pore diameter smaller than that.

It should be noted that the relationship between the total pore volume, the micropore volume, and the mesopore volume is as shown in the following expression (2).

$$\text{Micropore volume} = \text{total pore volume} - \text{mesopore volume} \quad (2)$$

It is desirable that the micropore volume be from 0.3 mL/g to 0.7 mL/g.

If the micropore volume is less than 0.3 mL/g, it may become difficult to ensure a sufficient specific surface area. As a consequence, water vapor may not be adsorbed sufficiently. On the other hand, if the micropore volume exceeds 0.7 mL/g, the response speed (i.e., the adsorption rate) may be lowered, because the micropore volume affects the diffusion rate of water vapor into the micropores.

The porous carbon as described above may be used as an adsorbent of a humidity control adsorbent. The porous carbon as described above may also be used as an adsorbent of an adsorption heat pump. The porous carbon as described above may also be used as a carbon-based carrier of an electrode for a fuel cell.

Hereinbelow, specific examples of the present invention will be described.

The above-described porous carbon may be prepared, for example, in the following manner. First, a flowable material containing an organic resin is wet-blended or dry-blended with an oxide (template particles) in a solution or powder state, to prepare a mixture. Next, this mixture is carbonized under a non-oxidizing atmosphere or a reduced pressure atmosphere at a temperature of, for example, 500° C. or higher. Finally, the template particles are removed by a washing treatment, and thereby, porous carbon can be prepared. The porous carbon prepared in this manner has a multiplicity of pores (mesopores and micropores). Note that the arrangement of the pores is not regular, and is in a structure in which the pores are arranged randomly.

Here, the diameter of the pores, the pore distribution of the porous carbon, and the thickness of the carbonaceous wall can be adjusted by varying the diameter of the template particles and the type of the organic resin. Therefore, by appropriately selecting the diameter of the template particles and the type of the organic resin, it becomes possible to prepare a porous carbon having a larger pore volume.

Specifically, as the organic resin, it is preferable to use a polyimide having at least one nitrogen or fluorine atom in its unit structure. The polyimide can be obtained by polycondensation of an acid component and a diamine component. However, in this case, it is necessary that either one of or both of the acid component and the diamine component contain at least one nitrogen atom or fluorine atom.

Specifically, a polyamic acid, which is the precursor of the polyimide, is deposited, and the solvent is removed by heating, to obtain a polyamic acid film. Next, the obtained polyamic acid film is subjected to heat imidization at 200° C. or higher, so that the polyimide can be prepared.

Examples of the diamine include: aromatic diamines including: 2,2-Bis(4-aminophenyl)hexafluoropropane, 2,2'-Bis(trifluoromethyl)-benzidine, and 4,4'-diaminooctafluoro-biphenyl; and 3,3'-difluoro-4,4'-diaminodiphenylmethane, 3,3'-difluoro-4,4'-diaminodiphenylether, 3,3'-di(trifluoromethyl)-4,4'-diaminodiphenylether, 3,3'-difluoro-4,4'-diaminodiphenylpropane, 3,3'-difluoro-4,4'-diaminodiphenylhexafluoropropane, 3,3'-difluoro-4,4'-diaminobenzophenone, 3,3',5,5'-tetrafluoro-4,4'-diaminodiphenylmethane, 3,3',5,5'-tetra(trifluoromethyl)-4,4'-diaminodiphenylmethane, 3,3',5,5'-tetrafluoro-4,4'-diaminodiphenylpropane, 3,3',5,5'-tetra(trifluoromethyl)-4,4'-diaminodiphenylpropane, 3,3',5,5'-tetrafluoro-4,4-diaminodiphenylhexafluoropropane, 1,3-diamino-5-(perfluorononenyloxy)benzene, 1,3-diamino-4-methyl-5-(perfluorononenyloxy)benzene, 1,3-diamino-4-methoxy-5-(perfluorononenyloxy)benzene, 1,3-diamino-2,4,6-trifluoro-5-(perfluorononenyloxy)benzene, 1,3-diamino-4-chloro-5-(perfluorononenyloxy)benzene, 1,3-diamino-4-pbromo-5-(perfluorononenyloxy)benzene, 1,2-diamino-4-(perfluorononenyloxy)benzene, 1,2-diamino-4-methyl-5-(perfluorononenyloxy)benzene, 1,2-diamino-4-methoxy-5-(perfluorononenyloxy)benzene, 1,2-diamino-3,4,6-trifluoro-5-(perfluorononenyloxy)benzene, 1,2-diamino-4-chloro5-(perfluorononenyloxy)benzene, 1,2-diamino-4-bromo-5-(perfluorononenyloxy)benzene, 1,4-diamino-3-(perfluorononenyloxy)benzene, 1,4-diamino-2-methyl-5-(perfluorononenyloxy)benzene, 1,4-diamino-2-methoxy-5-(perfluorononenyloxy)benzene, 1,4-diamino-2,3,6-trifluoro-5-(perfluorononenyloxy)benzene, 1,4-diamino-2-chloro-5-(perfluorononenyloxy)benzene, 1,4-diamino-2-bromo-5-(perfluorononenyloxy)benzene, 1,3-diamino-5-(perfluorohexenyloxy)benzene, 1,3-diamino-4-methyl-5-(perfluorohexenyloxy)benzene, 1,3-diamino-4-methoxy-5-(perfluorohexenyloxy)benzene, 1,3-diamino-2,4,6-trifluoro-5-(perfluorohexenyloxy)benzene, 1,3-diamino-4-chloro-5-(perfluorohexenyloxy)benzene, 1,3-diamino-4-bromo-5-(perfluorohexenyloxy)benzene, 1,2-diamino-4-(perfluorohexenyloxy)benzene, 1,2-diamino-4-methyl-5-(perfluorohexenyloxy)benzene, 1,2-diamino-4-methoxy-5-(perfluorohexenyloxy)benzene, 1,2-diamino-3,4,6-trifluoro-5-(perfluorohexenyloxy)benzene, 1,2-diamino-4-chloro-5-(perfluorohexenyloxy)benzene, 1,2-diamino-4-bromo-5-(perfluorohexenyloxy)benzene, 1,4-diamino-3-(perfluorohexenyloxy)benzene, 1,4-diamino-2-methyl-5-(perfluorohexenyloxy)benzene, 1,4-diamino-2-methoxy-5-

(perfluorohexenyloxy)benzene, 1,4-diamino-2,3,6-trifluoro-5-(perfluorohexenyloxy)benzene, 1,4-diamino-2-chloro-5-(perfluorohexenyloxy)benzene, 1,4-diamino-2-bromo-5-(perfluorohexenyloxy)benzene; and p-phenylenediamine (PPD) and dioxydianiline, which do not contain fluorine atoms. It is also possible that two or more of the foregoing aromatic diamines may be used in combination as the diamine component.

Examples of the acid component include: 4,4'-(hexafluoroisopropylidene)diphthalic anhydride (6FDA), which contains fluorine atoms; and 3,4,3',4'-biphenyltetracarboxylic dianhydride (BPDA) and pyromellitic dianhydride (PMDA), which contains no fluorine atom.

Examples of the organic solvent used as the solvent for the polyimide precursor include N-methyl-2-pyrrolidone and dimethylformamide.

The technique for imidization may follow either heat imidization or chemical imidization, as indicated by known methods [for example, see "Shin Kobunshi Jikkengaku, Vol. 3, Kobunshi no Gosei-Hanno (2)" (Experimental Polymer Science, New Edition, Vol. 3, Synthesis and reaction of polymers [2]), edited by Society of Polymer Science, Japan, Kyoritsu Shuppan, Tokyo, Mar. 28, 1996, p. 158]. These methods of imidization do not limit the present invention.

Furthermore, it is possible to use petroleum-based tar pitch, an acrylic resin, and the like, other than the polyimide.

Examples of the source material used as the above-mentioned oxide include alkaline-earth metal oxides (such as magnesium oxide and calcium oxide). It is also possible to use metal chlorides, metal nitrates, metal sulfates, and metal organic acids (such as magnesium citrate, magnesium oxalate, calcium citrate, and calcium oxalate), the state of which changes into magnesium oxide during the thermal decomposition process by a heat treatment.

As the cleaning solution for removing the oxide, it is preferable to use a dilute acid of 2 mol/L or lower of a common inorganic acid or an organic acid, such as hydrochloric acid, sulfuric acid, nitric acid, citric acid, acetic acid, and formic acid. It is also possible to use hot water of 80° C. or higher.

It is preferable that the carbonization of the mixture be performed under a non-oxidizing atmosphere or a reduced pressure atmosphere at a temperature of from 500° C. to 1500° C. The reason is as follows. The resins with a high carbon yield are polymers. Therefore, if the temperature is lower than 500° C., carbonization is insufficient and the pores do not develop sufficiently. On the other hand, if the temperature is higher than 1500° C., the shrinkage is great and the oxide is sintered and made into a large size, which causes the pore size to become small, resulting in a small specific surface area. The non-oxidizing atmosphere refers to an argon gas atmosphere, a nitrogen atmosphere, and the like, and the reduced pressure atmosphere refers to an atmosphere at 133 Pa (1 torr) or lower.

It is desirable that the just-described porous carbon have a bulk density of from 0.1 g/cc to 1.0 g/cc. If the bulk density is less than 0.1 g/cc, it is difficult to ensure a sufficient specific surface area, and the shape of the carbonaceous wall may not be maintained. On the other hand, if the bulk density exceeds 1.0 g/cc, the three-dimensional network structure may be difficult to form, so the formation of the pores may become insufficient.

EXAMPLES

Example 1

First, as illustrated in FIG. 1(a), magnesium oxide powder 2 (MgO, average particle size 5 nm) as template particles, and an organic resin 1 (polyvinyl alcohol) as a carbon precursor were mixed at a weight ratio of 3:2. Next, as illustrated in FIG. 1(b), this mixture was heat-treated under an inert atmosphere at 900° C. for 2 hours, to allow the polyvinyl alcohol to undergo heat decomposition. Thereby, a sintered substance provided with a carbonaceous wall 3 was obtained. Next, as illustrated in FIG. 1(c), the resultant sintered substance was washed with a sulfuric acid solution added at a concentration of 1 mol/L, to completely dissolve away the MgO. Thereby, a non-crystalline porous carbon 5 having a multiplicity of mesopores 4 was obtained.

The porous carbon material prepared in this manner is hereinafter referred to as a material A1.

Reference Example

Porous carbon was prepared in the same manner as described in Example 1 above, except that magnesium oxide powder having an average particle size of 20 nm was used as the template particles.

The porous carbon material prepared in this manner is hereinafter referred to as a material A2.

Example 3

Porous carbon was prepared in the same manner as described in Example 1 above, except that a magnesium salt (magnesium acetate) was used as the template particles, and an organic resin (polyvinyl alcohol) was used as the carbon precursor.

The porous carbon material prepared in this manner is hereinafter referred to as a material A3.

Comparative Example 1

A commercially available activated carbon (activated carbon made by Wako Pure Chemical Industries, Ltd. (product number 037-02115)) was used.

This activated carbon is hereinafter referred to as a material Z1.

Comparative Example 2

A carbon material was prepared by heat treating a film made of polyimide under a nitrogen atmosphere at 900° C.

The material prepared in this manner is hereinafter referred to as a material Z2.

Comparative Example 3

A commercially available synthetic zeolite-based adsorbent (synthetic zeolite A-3 made by Wako Pure Chemical Industries, Ltd. (product number 269-00555)) was used.

This material is hereinafter referred to as a material Z3.

Comparative Example 4

A commercially available synthetic zeolite-based adsorbent (synthetic zeolite F-9 made by Wako Pure Chemical Industries, Ltd. (product number 261-00635)) was used.

This material is hereinafter referred to as a material Z4.

Comparative Example 5

A commercially available silicon dioxide (MCM-41 type 643645, made by Sigma-Aldrich Co. LLC.) was used.

This material is hereinafter referred to as a material Z5.

Experiment

For the above-described materials A1 to A3 and Z1 to Z5, BET specific surface area and so forth were determined in the following manner. The results are also shown in Table 1.

means that the relative humidity is 90%, and hereinafter may be referred to as RH 90) were determined, and the water vapor adsorbed amount ratio defined by the following expression (1) was calculated.

Water vapor adsorbed amount ratio=water vapor adsorbed amount at RH 90/water vapor adsorbed amount at RH 70  (1)

TABLE 1

| Material | BET specific surface area ($m^2$/g) | Total pore volume (mL/g) | Mesopore | | Micropore | | Water vapor adsorbed amount at RH 70 (mg/g) | Water vapor adsorbed amount at RH 90 (mg/g) | Water vapor adsorbed amount at RH 90/Water vapor adsorbed amount at RH 70 |
|---|---|---|---|---|---|---|---|---|---|
| | | | Pore diameter (nm) | Volume (mL/g) | Pore diameter (nm) | Volume (mL/g) | | | |
| A1 | 1701 | 2.478 | 4.8 | 1.861 | 0.61 | 0.617 | 66 | 512 | 7.8 |
| A2 | 593 | 1.062 | 32.6 | 0.834 | 0.51 | 0.228 | 110 | 253 | 2.3 |
| A3 | 1577 | 1.716 | 8.1 | 1.137 | 0.61 | 0.579 | 223 | 682 | 3.1 |
| Z1 | 916 | 0.452 | 2.4 | 0.024 | 0.66 | 0.428 | 303 | 333 | 1.1 |
| Z2 | 700 | 0.300 | 2.4 | 0.040 | 0.52 | 0.260 | 176 | 187 | 1.1 |
| Z3 | | 0.994 | $3.4 \times 10^{-4}$ | — | 0 | 3.04 | $3.4 \times 10^{-4}$ | 248 | 252 | 1.0 |
| Z4 | 627 | 0.275 | — | 0 | 0.54 | 0.275 | 308 | 327 | 1.1 |
| Z5 | 804 | 0.729 | 2.4 | 0.455 | 0.59 | 0.274 | 349 | 582 | 1.7 |

(1) First, each of the materials A1 to A3 and Z1 to Z5 was placed in a hermetically sealed glass cell for adsorption measurement, and thereafter, a degassing treatment was performed under vacuum at 300° C. for 2 hours.

(2) Using nitrogen as the adsorptive gas, a nitrogen adsorption isotherm was obtained by conducting a measurement at 77K (−196° C.). For the just-mentioned measurement, an automatic gas/vapor adsorption measurement apparatus BELSORP-18, made by Bel Japan, Inc., was used. The BET specific surface area was calculated from the measurement points in the range of relative pressure $(P/P_0)$=0.05 to 2.20.

The total pore volume was determined from the adsorbing amount at a relative pressure $(P/P_0)$ of 0.95, and the volume of micropores was determined by the Dubinin-Radushkevich (DR) method. The mesopore volume was obtained from the difference between the total pore volume and the volume of micropores.

(3) Derivation of Mesopore Diameter and Micropore Diameter

The mesopore diameter was determined by the BJH (Barret-Joyner-Halenda) method, and the micropore diameter was determined by the HK (Horvath-Kawazoe) method.

(4) Water Vapor Adsorption Measurement

Figure 2:
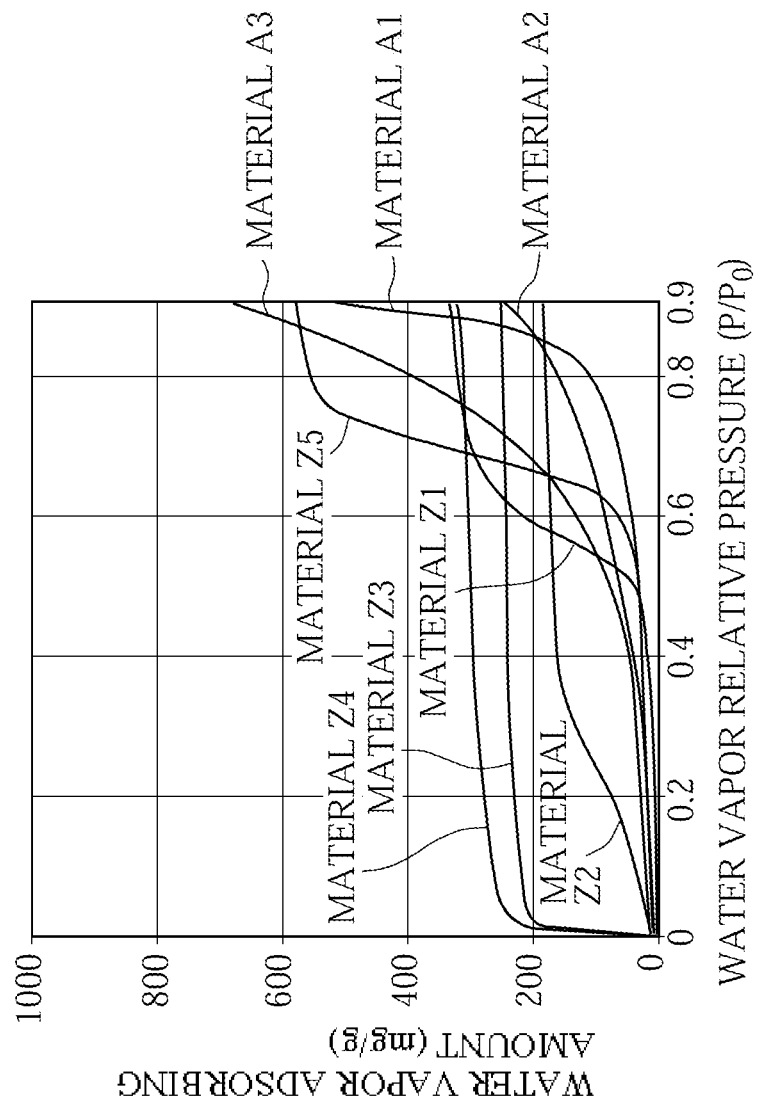
FIG. 2 is a graph showing the relationship of relative humidity and water vapor adsorbed amount for carbons A1 to A3 and Z1 to Z5.

The water vapor adsorption measurement was carried out using an automatic gas/vapor adsorption measurement apparatus BELSORP-18, made by Bel Japan, Inc. The measurement conditions were: the adsorption temperature was set at 25° C., and the relative pressure $(P/P_0)$ was set to be in the range of 0 to 0.9. Distilled water that has been highly purified by repeating freezing and deforming processes 4 or 5 times was used as the water that serves as an adsorbate. The resulting adsorption isotherm was plotted taking the water vapor relative pressure $(P/P_0)$ on the horizontal axis and the amount of water vapor adsorbed per 1 g of the sample (mg/g) on the vertical axis. The results are shown in FIG. 2.

Then, from FIG. 2, the water vapor adsorbed amount at the time when the water vapor relative pressure $P/P_0$ at 25° C. is 0.70 (which means that the relative humidity is 70%, and hereinafter may be referred to as RH 70) and the water vapor adsorbed amount at the time when $P/P_0$=0.90 (which As clearly seen from Table 1 and FIG. 2, for the materials Z1 to Z5, the value of the water vapor adsorbed amount at RH 90/the water vapor adsorbed amount at RH 70 (hereinafter also referred to as "RH 90/RH 70") is from 1.0 to 1.7, but in contrast, for the materials A1 to A3, the value of RH 90/RH 70 is from 2.3 to 7.8. This means that the materials A1 to A3 have a higher value of RH 90/RH 70 than the materials Z1 to Z5. Thus, in each of the materials Z1 to Z5, the porous carbon is in the state where it only has little extra capacity for adsorbing water vapor at the time point of RH 70, so it can adsorb little more water vapor at the time when RH 90 is reached. In contrast, in each of the materials A1 to A3, the porous carbon is in the state where it has sufficient extra capacity for adsorbing water vapor at the time point of RH 70, so it can adsorb water vapor sufficiently even at the time when RH 90 is reached.

It is believed that such a result was obtained because the water vapor adsorbed amount at a high humidity greatly depends on the mesopore volume. That is, the materials A1 to A3 have a very large mesopore volume, from 0.834 to 1.861 mL/g. On the other hand, in the materials Z1 to Z5, mesopores do not exit, or even if they do, the volume thereof is very small, from 0.024 to 0.455 mL/g. For this reason, the experimental results as described above are obtained.

INDUSTRIAL APPLICABILITY

The present invention is applicable to a humidity controlling and adsorbent material, adsorption heat pump, an electrode carrier for fuel cells, and the like.

REFERENCE SIGNS LIST

1—Polyamic acid resin
2—Magnesium oxide
3—Carbonaceous wall
4—Pore
5—Porous carbon

The invention claimed is:
1. A porous carbon characterized by comprising mesopores and micropores and having a mesopore volume of from 0.9 mL/g to 2.0 mL/g and a water vapor adsorbed amount ratio of 2.0 or higher, the water vapor adsorbed amount ratio being defined by the following expression:

> Water vapor adsorbed amount ratio=water vapor adsorbed amount at a relative humidity of 90%/ water vapor adsorbed amount at a relative humidity of 70%.

2. The porous carbon according to claim 1, wherein the mesopores have a pore diameter of from 3 nm to 50 nm.

3. The porous carbon according to claim 2, wherein the mesopores have a pore diameter of from 4.5 nm to 50 nm.

4. The porous carbon according to claim 1, wherein the water vapor adsorbed amount at a relative humidity of 70% is 50 mg/g or greater.

5. The porous carbon according to claim 1, wherein the water vapor adsorbed amount at a relative humidity of 90% is from 300 mg/g to 700 mg/g.

6. The porous carbon according to claim 1, wherein the micropore volume is from 0.3 mL/g to 0.7 mL/g.

7. A porous carbon characterized by comprising mesopores and micropores and having a water vapor adsorbed amount ratio of 1.8 or higher, the water vapor adsorbed amount ratio being defined by the following expression, and wherein the water vapor adsorbed amount at a relative humidity of 90% is from 512 mg/g to 700 mg/g:

water vapor adsorbed amount ratio=water vapor adsorbed amount at a relative humidity of 90%/water vapor adsorbed amount at a relative humidity of 70%, wherein the mesopores have a pore diameter of from 3 nm to 50 nm, and the mesopore volume is from 0.9 mL/g to 2.0 mL/g.

8. The porous carbon according to claim 7, wherein the water vapor adsorbed amount ratio is 2.0 or higher.

9. The porous carbon according to claim 7, wherein the water vapor adsorbed amount at a relative humidity of 70% is 50 mg/g or greater.

10. The porous carbon according to claim 8, wherein the water vapor adsorbed amount at a relative humidity of 70% is 50 mg/g or greater.

11. The porous carbon according to claim 7, wherein the mesopores have a pore diameter of from 4.5 nm to 50 nm.

12. The porous carbon according to claim 7, wherein the micropore volume is from 0.3 mL/g to 0.7 mL/g.

13. A humidity control adsorbent, characterized by using the porous carbon according to claim 1 as an adsorbent.

14. An adsorption heat pump, characterized by using a porous carbon as an adsorbent, wherein the porous carbon comprises mesopores and micropores and having a mesopore volume of from 0.9 mL/g to 2.0 mL/g and a water vapor adsorbed amount ratio of 1.8 or higher, the water vapor adsorbed amount ratio being defined by the following expression:

> Water vapor adsorbed amount ratio=water vapor adsorbed amount at a relative humidity of 90%/ water vapor adsorbed amount at a relative humidity of 70%.

15. A fuel cell, characterized by using a porous carbon as an adsorbent, wherein the porous carbon comprises mesopores and micropores and having a mesopore volume of from 0.9 mL/g to 2.0 mL/g and a water vapor adsorbed amount ratio of 1.8 or higher, the water vapor adsorbed amount ratio being defined by the following expression:

> Water vapor adsorbed amount ratio=water vapor adsorbed amount at a relative humidity of 90%/ water vapor adsorbed amount at a relative humidity of 70%.

* * * * *